P. J. QUINLAN.
AUXILIARY REGULATING DEVICE FOR PRESSURE REGULATORS.
APPLICATION FILED FEB. 21, 1913.
1,111,493. Patented Sept. 22, 1914.
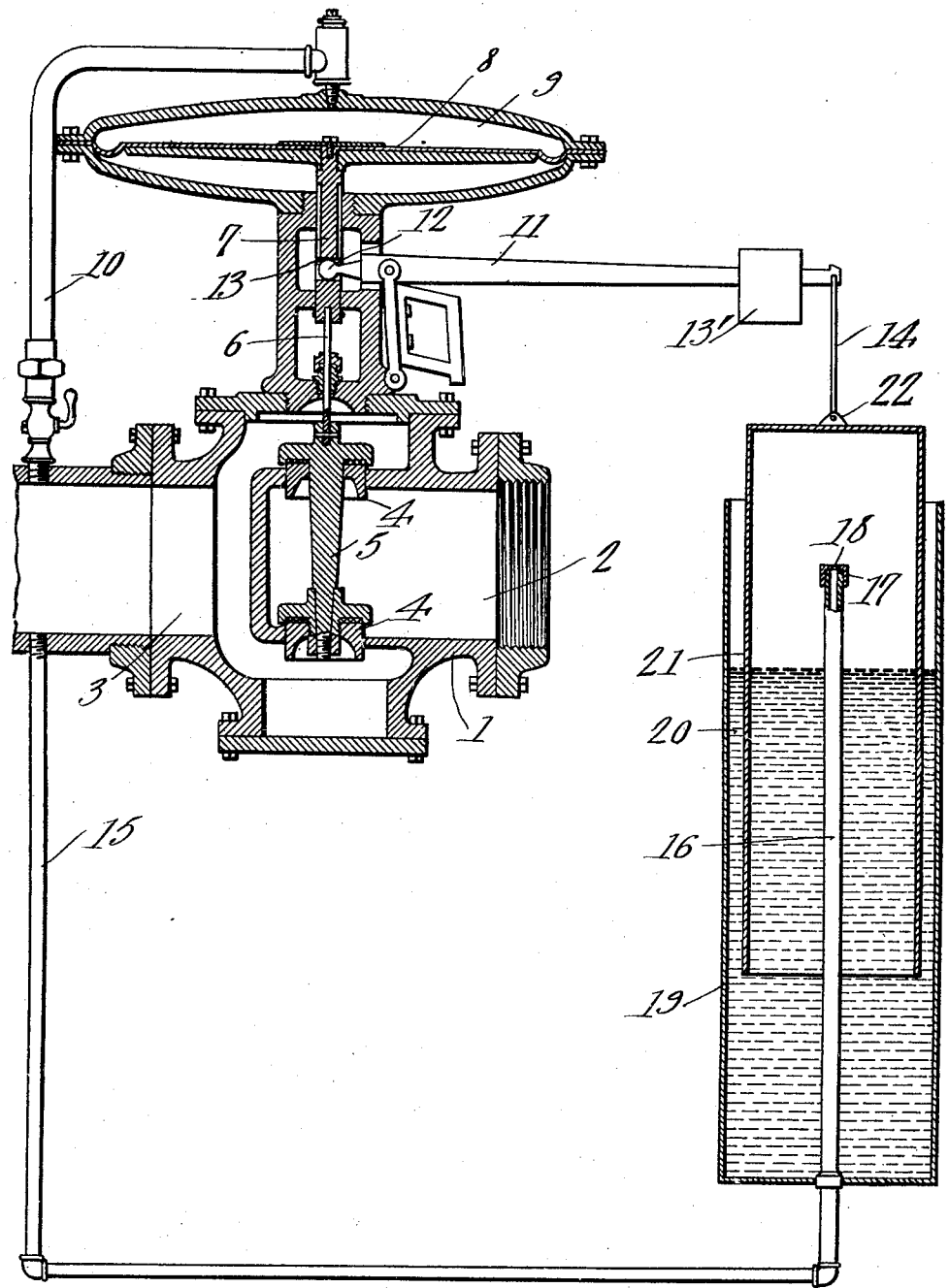

UNITED STATES PATENT OFFICE.

PETER J. QUINLAN, OF MARIETTA, OHIO.

AUXILIARY REGULATING DEVICE FOR PRESSURE-REGULATORS.

1,111,493.  Specification of Letters Patent.  Patented Sept. 22, 1914.

Application filed February 21, 1913. Serial No. 749,977.

*To all whom it may concern:*

Be it known that I, PETER J. QUINLAN, a citizen of the United States, residing at Marietta, in the county of Washington and State of Ohio, have invented a new and useful Auxiliary Regulating Device for Pressure-Regulators, of which the following is a specification.

The present invention relates to improvements in auxiliary regulating devices for pressure regulators, one object of the present invention being the provision of pressure actuated means adapted to be connected to the over balancing member of the pressure regulating valve to regulate the action thereof so as to prevent a too sudden increase or decrease of pressure due to the too sudden action of the pressure controlling valve, such means being controlled from the pressure fluid after the passage thereof through the regular pressure controlling valve.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings, is illustrated a pressure regulating valve of the "Fulton" low pressure regulator type, with the present invention applied thereto and shown in vertical section.

Referring to the drawings, the numeral 1 designates the main casing of the pressure regulating valve having the inlet 2 and the outlet 3. The two balanced valves 4, of usual construction are carried by the connecting member 5 and from this connecting member 5 is led the piston stem 6 which is connected to the enlarged stem 7 whose outer end is operably connected to the diaphragm 8 disposed in the diaphragm chamber 9. The pressure after passing through the valve casing 1 is led through the valved conduit 10 to the outer chamber of the diaphragm casing 9 and thus operates upon the diaphragm to close the valve 4 when the pressure within the outlet 3 exceeds a predetermined and required pressure. The usual overbalancing lever 11 having the ball end 12 disposed in the aperture 13 of the stem 7 and carrying the weight 13′ is employed to operate in opposition to the diaphragm 8, while connected in the outer free end of the lever 11 is a link 14, the purpose of which will presently appear.

The present device which is attached to control the lever 11 and consequently the valve 4 through the pressure after passage through the casing 1 into the outlet 3, is readily applied to any form of pressure regulating valve, the present "Fulton" pressure regulating valve being preferably shown to demonstrate the use of the same. Led from the outlet 3 is a conduit 15, which is of lesser diameter than the conduit 10, the same being provided with the upstanding outlet end 16 having fitted thereon a cap 17 provided with a reduced outlet aperture 18. In practice this outlet 18 is approximately $\frac{1}{8}$ of an inch in diameter.

A cylindrical chamber or receptacle 19, incases the vertical pipe 16 which terminates at a point below the top open end thereof, and above the level of the oil seal 20 contained within the receptacle 19. Mounted for vertical sliding movement within the receptacle 19, is a cylindrical bell 21, provided with the apertured lug 22 concentrically of the sealed end thereof and pivotally connected to the lower end of the link 14, so that the bell 21 is suspended from the outer free end of the lever 11. As shown, the oil seal permits of a gas receiving chamber within the upper end of the bell 21, so that the gas or pressure fluid received through the outlet 18 will enter the chamber and any excess of pressure within the outlet 3, will cause the elevation of the bell 21 and through the link 14 the elevation of the outer end of the lever 11, this elevation of the outer end will cause the depression of the inner end and will cause the lowering of the valves 4 into closing or closed position, thus regulating the flow of the gas or pressure fluid from the inlet through the outlet of the casing. By this means the gas or pressure fluid within the bell 21 above the liquid level of the receptacle 19, will form a resilient cushion to lend a slow and steady movement to the lever 11, instead of a jerky movement, as is caused by the quick introduction of an overcharge against the diaphragm 8, and the consequent quick release due to the seating of the valves 4.

It has been found in practice, that with the present attachment connected to a pressure regulating valve of this character, that practically no variation in the pressure of the gas or pressure fluid passing through the outlet 3 is noticeable, an indicating device controlled by such pressure having shown that for a period of twenty-four hours that the gas was fed at an even pressure and without any variations or fluctuations whatsoever.

As before stated, the present invention although applied to the "Fulton" type of valve, is readily applied to any form of pressure regulating valve, it being essential that the conduit 15 be connected beyond the outlet end of the valve, so as to be affected by the reduced pressure instead of the pressure before passing through the valve. By this means the pressure desired acts entirely upon the free end of the overbalancing lever 11 and assists the weight 13' in gradually elevating the lever to permit of the proper closing of the valve 4 and to a great extent, not only steadies the actuation of the lever, but the movement of the diaphragm 8.

The action of the gas or pressure fluid within the chamber of the bell 21 upon the oil or liquid seal therewithin, produces a desirable cushioning effect and the consequent action thereof upon the lever 11 imparts to the valve 4 such a steady movement as to permit of the checking or releasing of the pressure fluid or gas from the inlet to the outlet without any perceptible change of the pressure in the outlet.

What is claimed is:

The combination with a main pressure regulator, having a pressure and weight controlled lever, of an auxiliary regulating device for the lever, including a liquid container having an upper open end, a bell inverted within the liquid and surrounded by the container, a flexible coupling connecting the bell to the free end of the weighted lever of the regulator, a pressure fluid conduit disposed concentrically through the lower end of the container and having its outlet at its upper end disposed at a point above the liquid within the bell, and an apertured cap detachably covering the outlet end thereof, whereby the escape outlet may be varied according to the aperture of the cap.

In testimony that I claim the foregoing as my own, I have hereto affixed my signature in the presence of two witnesses.

PETER J. QUINLAN.

Witnesses:
ALLEN T. WILLIAMSON,
ELVA MARTIN.